(12) United States Patent
Guerin et al.

(10) Patent No.: US 7,500,716 B2
(45) Date of Patent: Mar. 10, 2009

(54) MULTI-FUNCTION TRAY TABLE

(75) Inventors: Jeanne Guerin, Mukilteo, WA (US);
Shawn A. Cleflin, Lake Stevens, WA (US); Mark E. Wentland, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 1227 days.

(21) Appl. No.: 10/172,398

(22) Filed: Jun. 14, 2002

(65) Prior Publication Data

US 2003/0233659 A1    Dec. 18, 2003

(51) Int. Cl.
*A47B 39/00* (2006.01)
(52) U.S. Cl. .......................... 297/146; 297/163; 725/77
(58) Field of Classification Search .................. 725/75, 725/76, 77; 297/146, 163
See application file for complete search history.

(56) References Cited

U.S. PATENT DOCUMENTS

| | | | |
|---|---|---|---|
| 4,584,603 A * | 4/1986 | Harrison | 725/76 |
| 5,092,652 A * | 3/1992 | Macaluso | 297/146 |
| 5,765,911 A | 6/1998 | Sorenson | |
| 6,102,476 A | 8/2000 | May et al. | |
| 6,249,913 B1 | 6/2001 | Galipeau et al. | |
| 6,270,157 B1 | 8/2001 | Kapushinski | |
| 6,430,038 B1 * | 8/2002 | Helot et al. | 361/681 |
| 2003/0054687 A1 * | 3/2003 | Sanner et al. | 439/535 |

FOREIGN PATENT DOCUMENTS

| | | | |
|---|---|---|---|
| GB | WO 00/02745 | * | 1/2000 |
| JP | 01 094048 A | | 12/1989 |
| JP | 02 164635 A | | 6/1990 |
| WO | WO 00/02745 A1 | | 1/2000 |
| WO | WO 01/30607 A1 | | 5/2001 |

\* cited by examiner

*Primary Examiner*—Christopher Kelley
*Assistant Examiner*—Timothy R Newlin (57) ABSTRACT

The present invention is an entertainment device coupled to a tray table. The present invention includes a tray table, and a display device mounted to the tray table. The display device is rotatably attached to the tray table. The tray table includes a first section that is rotatably attached to a second section and the second section table is slideably attached to at least one of a bulkhead or a seatback. The present invention also includes a processing device coupled to the display, a user interface device coupled to the processing device, a passenger control unit/telephone headset, head phone jack, and personal computer jack (data and power). The processing device is electrically coupled to at least one of an on-board entertainment system or telecommunications system.

17 Claims, 8 Drawing Sheets

MULTI-FUNCTION TRAY TABLE

FIELD OF THE INVENTION

The present invention relates to tray tables, and more particularly, to tray tables for rowed seats.

BACKGROUND OF THE INVENTION

Passengers riding in vehicles are able to enjoy video entertainment, such as movies, videos, television, and the like, and perform data communications while underway. However, some passengers riding in vehicles that include row seats may experience some limitations to their abilities to see video entertainment and perform data communications.

In some vehicles, passengers seated in row seats have an ability to use a phone that is mounted in front of them. Most of these phones do not provide an ability to perform data communications, such as sending or receiving electronic mail (email). The phones that do provide data communications services are limited due to limitations of the phone's user interface, i.e. small display and 12 key keypad. Also, the phone is tethered to a phone base, thereby intruding on other passengers' space if the phone is not mounted directly in front of the user. For example, some passengers can view video entertainment by viewing a screen that is mounted in the ceiling above a passageway, or a screen that is mounted overhead the seats. In some vehicles, passengers may attempt to put their heads in somewhat awkward positions to view these screens. Also, the position of screens relative to seats may make it difficult for a passenger to see the screen or the screen may be blocked by the head of another passenger. Further, some passengers may have limited or no choice regarding selection of entertainment for viewing.

Therefore, there exists a need for a device that allows each passenger to easily view video and perform data communications.

SUMMARY OF THE INVENTION

The present invention is a device that allows each passenger to easily view video and perform data communications from their seats in row seats.

The present invention provides an entertainment device coupled to a tray table. The present invention includes a tray table, and a display device mounted to the tray table. The display device is rotatably attached to the tray table. The tray table includes a first section that is rotatably attached to a second section and the second section table is slideably attached to at least one of a bulkhead or a seatback.

The present invention also includes a processing device coupled to the display, and a user interface device coupled to the processing device. The processing device is electrically coupled to either an on-board central entertainment system or telecommunications system.

The present invention also includes a passenger control unit/telephone headset, head phone jack, and personal computer jack (data and power).

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
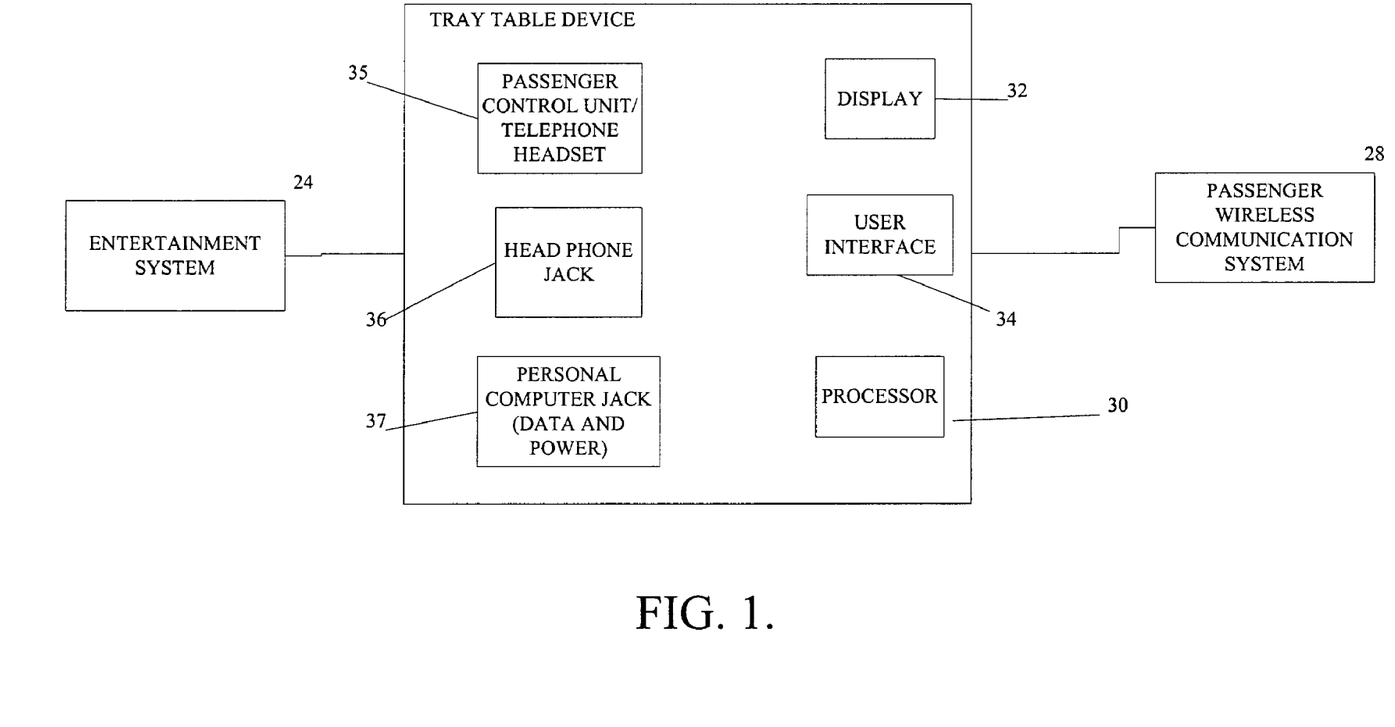
FIG. 1 illustrates a block diagram of the present invention as coupled to other on-board vehicle systems.

Referring to FIG. 1, the present invention is a tray table device 20 that is mounted in a vehicle (not shown) to the back of a seat (not shown) or bulkhead (not shown) located directly in front of a seat. The tray table device 20 includes a processor 30 coupled to a display 32, and a user interface 34. The processor 30 is suitably coupled to an entertainment system 24 or passenger wireless communication system 28 that are located within the vehicle. An exemplary entertainment/communication system is shown and described in U.S. patent application Ser. No. 09/639,912 filed Aug. 16, 2000, which is hereby incorporated by reference. The vehicle is suitably a mass transportation vehicle, such as a car, a bus, a train, a plane, a ferry, or any other vehicle that desirably includes a combined tray table and display device with user interface. The tray table device 20 also includes a passenger control unit/telephone headset 35, head phone jack 36, and personal computer jack (data and power) 37.

Figure 2:
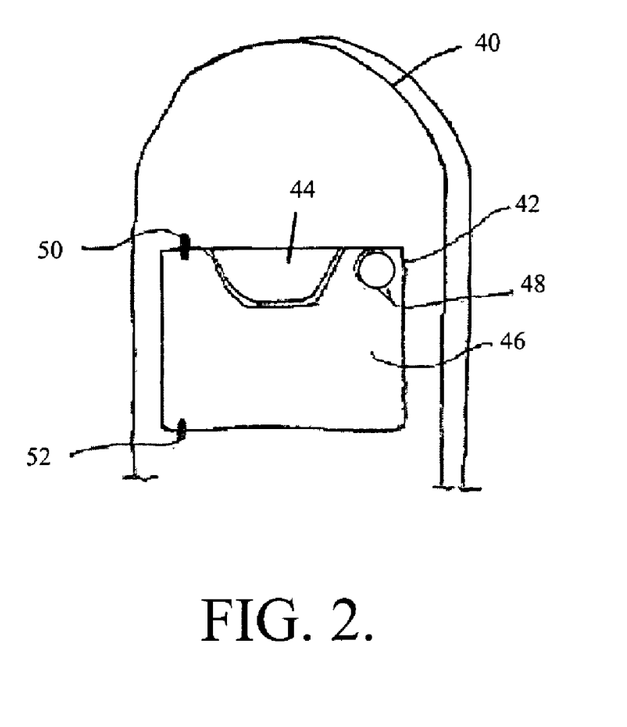
FIGS. 2-10 illustrate perspective views of various embodiments of the present invention in various deployable positions.

FIGS. 2-5 illustrate an exemplary tray table combined with a display and user interface suitably for seats that have a fixed backrest and don't recline or have limited recline. As shown in FIG. 2, the back of a seat 40 includes a tray table 42 secured in an upright and locked position. In the locked position the tray table 42 is substantially flush with the surface of the back of the seat 40 or other surface that receives the tray table 42, such as a bulkhead. The tray table 42 includes an entertainment and communication device 44 and a first section 46. The first section 46 includes a circular cutout or cup holder 48 suitably located in a corner of the first section 46. The tray table 42 is secured in the upright locked position by one or more clip devices 50 and 52 that are rotatably attached the seat 40. Other locking mechanisms may be used as desired. The first section 46 is substantially rectangular with an indented edge for receiving the entertainment and communication device 44. The size and shape of the indented edge in the first section 46 is based on the size and shape of the entertainment and communication device 44 in first section 46 and requirements relating to passenger seating position in the seat directly behind the seat 40 that mounts the tray table 42.

Figure 3:
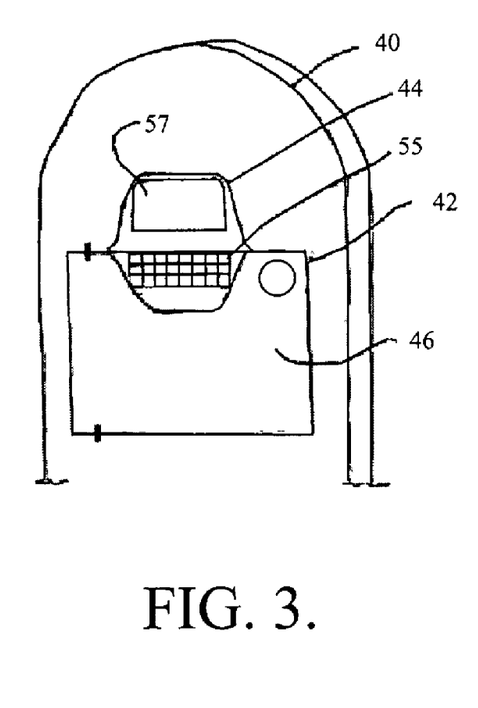

As shown in FIG. 3, the entertainment and communication device 44 includes a display 57 hingedly mounted to a user interface 55 or a second section (not shown). With the display 57 in an open position, as shown in FIG. 3, the passenger can view video entertainment presented on the display 57 without having to detach the tray table 42 from its upright and locked position.

Figure 4:
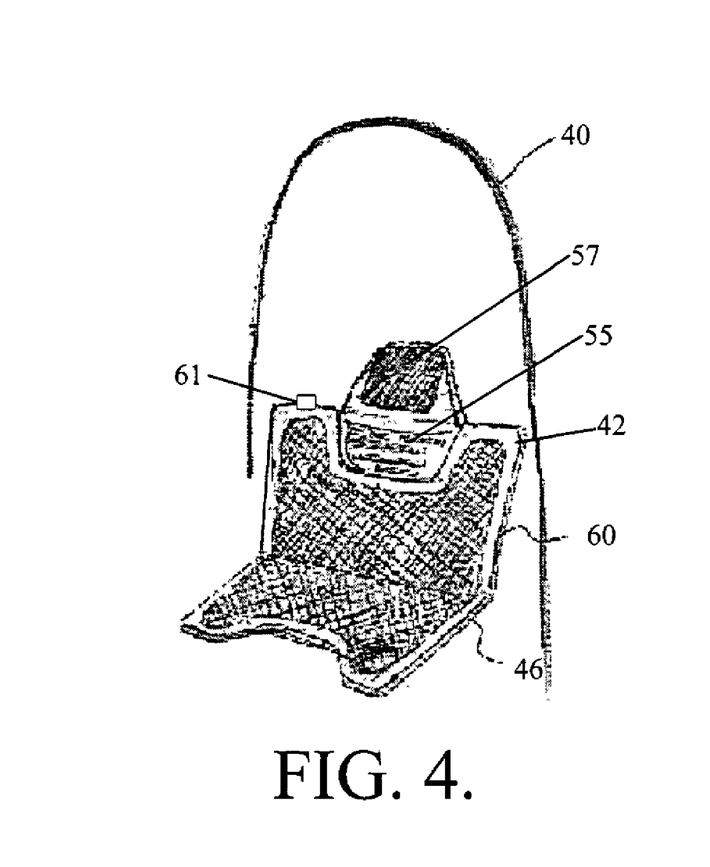

As shown in FIG. 4, the first section 46 is hindgedly attached to a second section 60 of the tray table 42 along an edge opposite of the indented edge. The mechanism that hingedly attaches the first section 46 to the second section 60 allows the first section 46 to lock at a position approximately 90 degrees from the second section 60. In the configuration shown, the second section 60 remains secured to the back of the seat 40. The second section 60 is shaped similar to the first section 46. The user interface 55 is mounted into the second section 60 along an edge opposite the edge that is hingedly attached to the first section 46. The user interface 55 includes a plurality of keys organized in a specified layout, such as a QWERTY layout for English language layouts. It can be appreciated that other language keyboards can be used. A hinge (not shown) between the first and second sections 46, 60 includes a locking mechanism that allows the first and second sections 46, 60 to lock into a 90 degree, 180 degree, or other positions. The hinge includes a push button or detent that performs the locking of the hinge. A male/female push button connector 61 located on top of section 60 and connected to back of the seat 40 keeps the section 60 secured to the seat 40 when the first section 46 is deployed.

Figure 5:
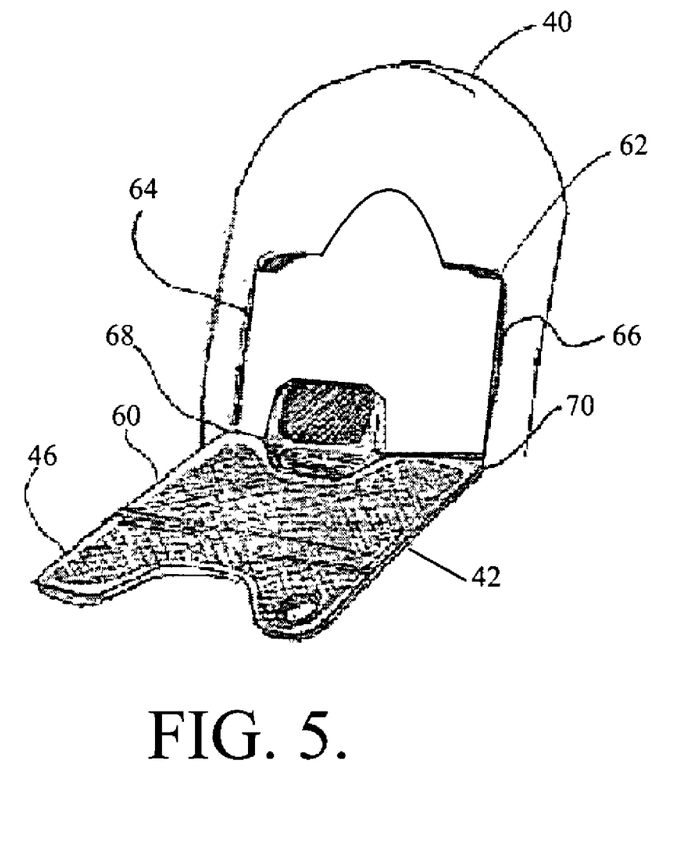

As shown in FIG. 5, the tray table 42 is fully deployed; that is, the first section 46 is rotated to an approximately parallel position with the second section 60. The first and section sections 46 and 60 are in a position substantially parallel to the floor of the vehicle. The display device 57 is rotated to a position not substantially parallel with the second section 60. The display device 57 can be rotated into a plurality of positions, one of which is closed (not shown). When the first section 46 and display device 57 are both closed, they provide a substantially flat working surface.

A cavity 62 receives the tray table 42 when in the fully upright and locked position, thereby allowing the tray table 42 to be flush with the backside of the seat 40. The cavity 62 also includes a portion that receives the display 57 when in the opened position with the tray table 42 in the up and locked position. Along vertical sidewalls of the cavity 62 are first and second support grooves or rails 64 and 66. The first and second support rails 64 and 66 receive first and second pins 68 and 70. The first and second pins 68 and 70 are attached at or near opposite ends of the second section 60 nearest the entertainment and communication device 44. The first and second pins 68 and 70 include a locking mechanism (not shown) that locks the second section 60 at a position approximately parallel the deck/floor of the vehicle. The rails 64 and 66 and pins 68 and 70 allow the tray table 42 to move up and down within the cavity 62 without ever being fully detached from the back of the seat 40.

When the tray table 42 is locked in the cavity 62, the cavity 62 includes a section for receiving the display 57 if opened, see FIGS. 3 and 5.

Figure 6:
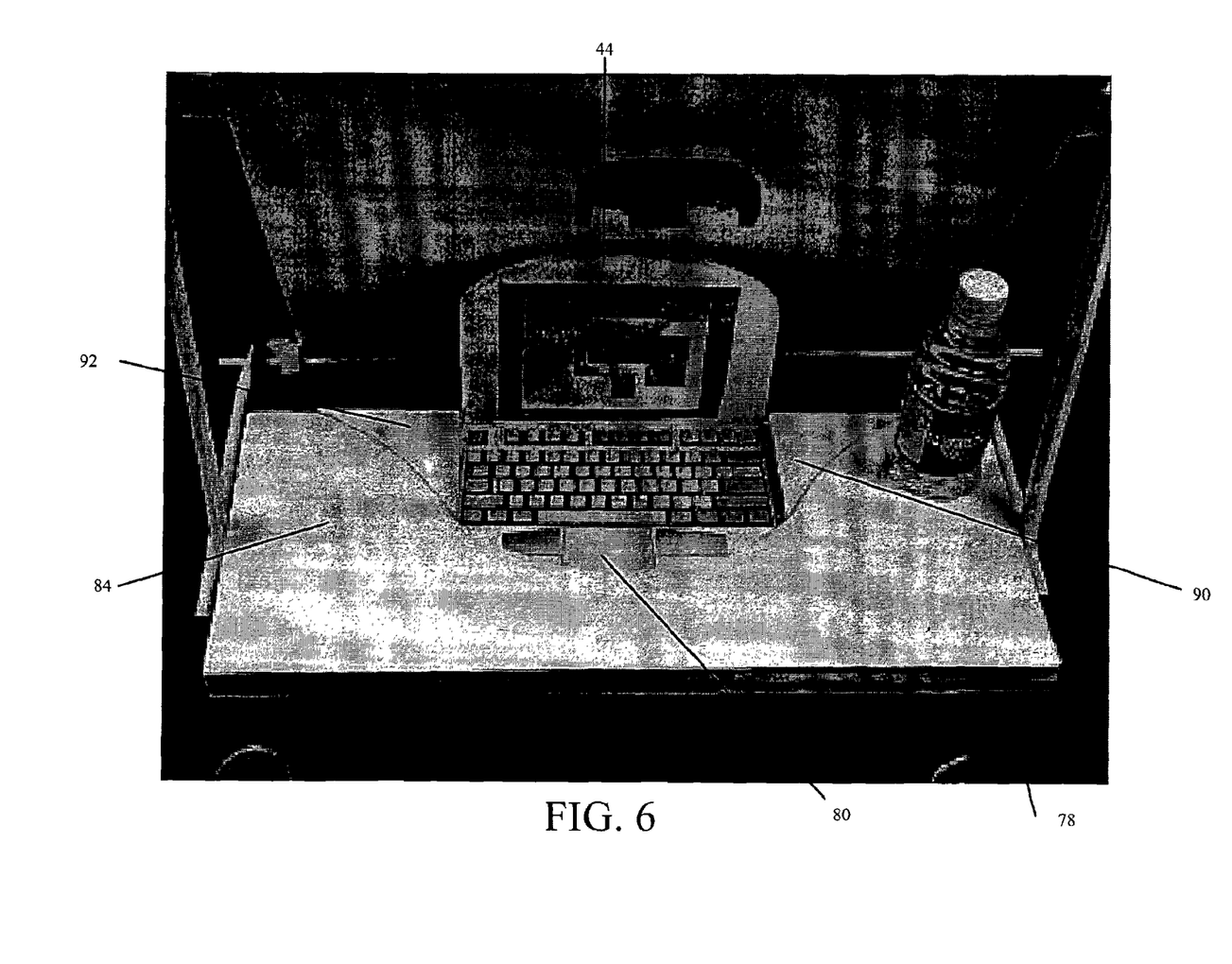
Figure 7:
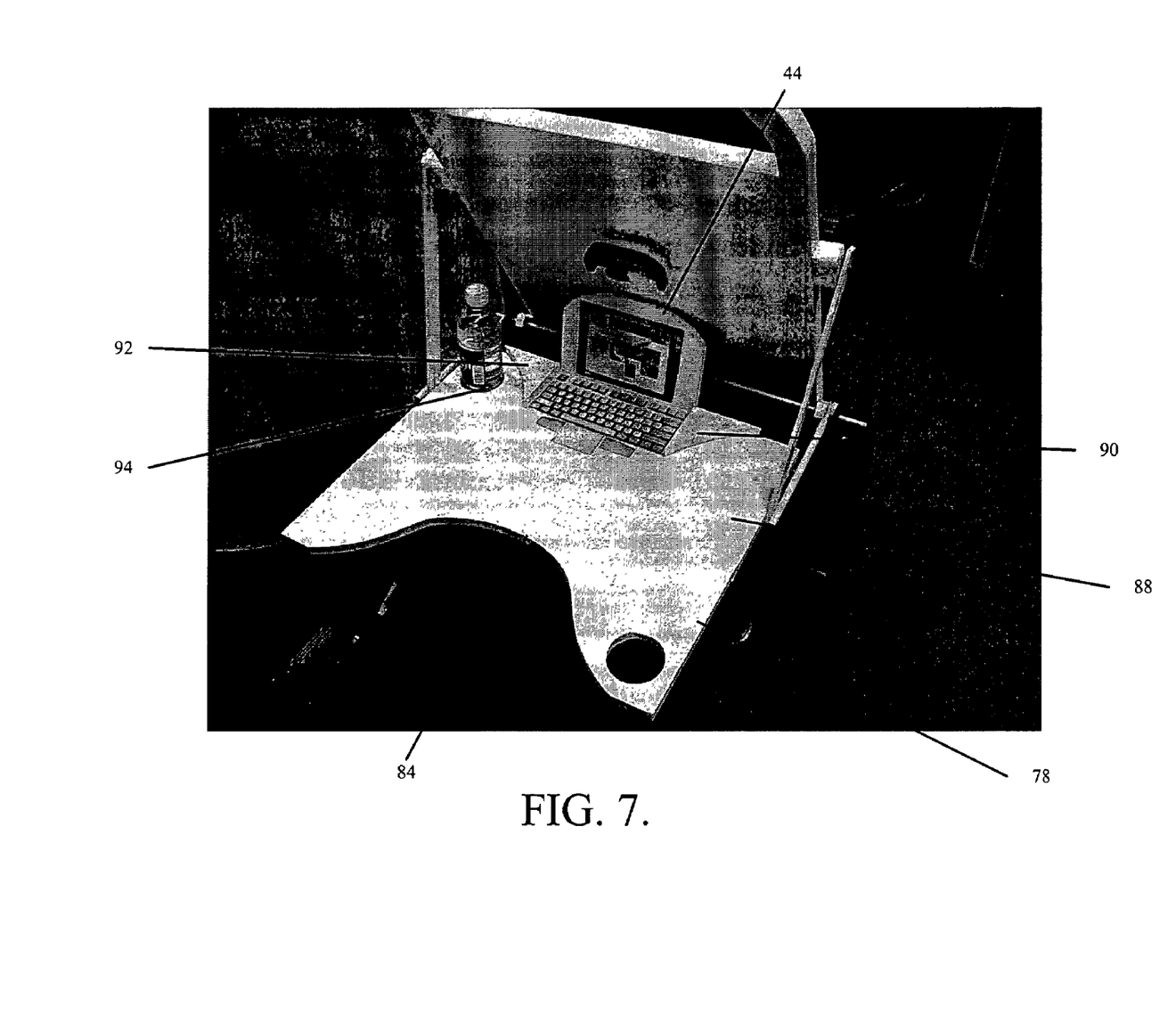

FIGS. 6 and 7 illustrate an alternate embodiment of the present invention. A tray table 78 includes a cursor control device 80 built into a second section 88. Also, the tray table 78 includes a first section 84 that has a larger indent along the edge that receives the entertainment and communication device 44. Attached adjacent to the entertainment and communication device 44 are first and second gap fillers 90 and 92. The first and second gap fillers 90 and 92 fill a gap that would be present when the first section 84 is in the folded position, (FIG. 6). The gap that is filled by the gap fillers 90 and 92 is defined by the area between the entertainment and communication device 44 and indented edge of the first section 84. When the entertainment and communication device 44 is closed, and the first section 84 is folded, the back surface of the display device is approximately flush with the top surface of the folded first section 84 and the top surface of the gap fillers 90 and 92. In this embodiment, the second section 88 includes a cup holder 94 that can be positioned at either side of the entertainment and communication device 44.

Figures 8A, 8B, 8C:
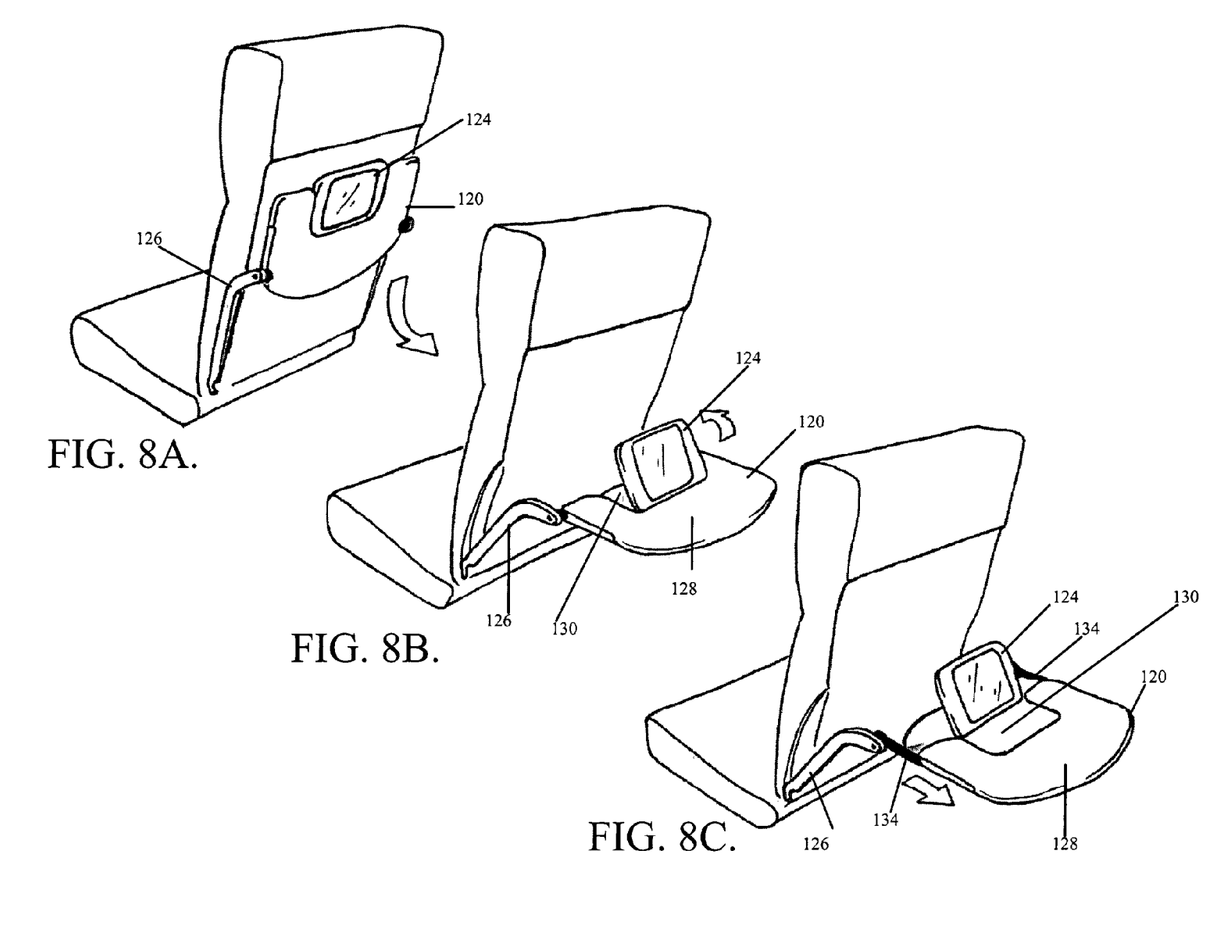

FIGS. 8A-C illustrates alternate embodiments of the present invention. As shown in FIG. 8A, a tray table 120 is rotatably attached to tray table arms 126 that are attached to the approximately same rotation point as a back of the seat that the tray table 120 is connected to. When the tray table 120 is in the up and locked position, a display 124 and a top work surface 128 are viewable to a passenger seated behind the seat with the mounted tray table 120.

As shown in FIG. 8B, when the tray table 120 is released from its up and locked postion, the tray table arms 126 rotate to a position for supporting the tray table 120 so that the work surface 128 of the tray table 120 is approximately parallel to the floor of the vehicle. The display 124 is hingedly attached to a stationary portion 130 of the tray table 120 for better viewing by the passenger.

As shown in FIG. 8C, the tray table 120 includes a slidable portion 132 that includes the work surface 128 that is slidably attached to rails 134 that are rotatably attached to the tray table arms 126. When the slidable portion 132 of tray table 120 is extended toward the passenger, more surface area for the passenger is available, because the stationary portion 130 with the attached display 124 do not move relative to the portion 132.

Figures 9A, 9B, 9C:
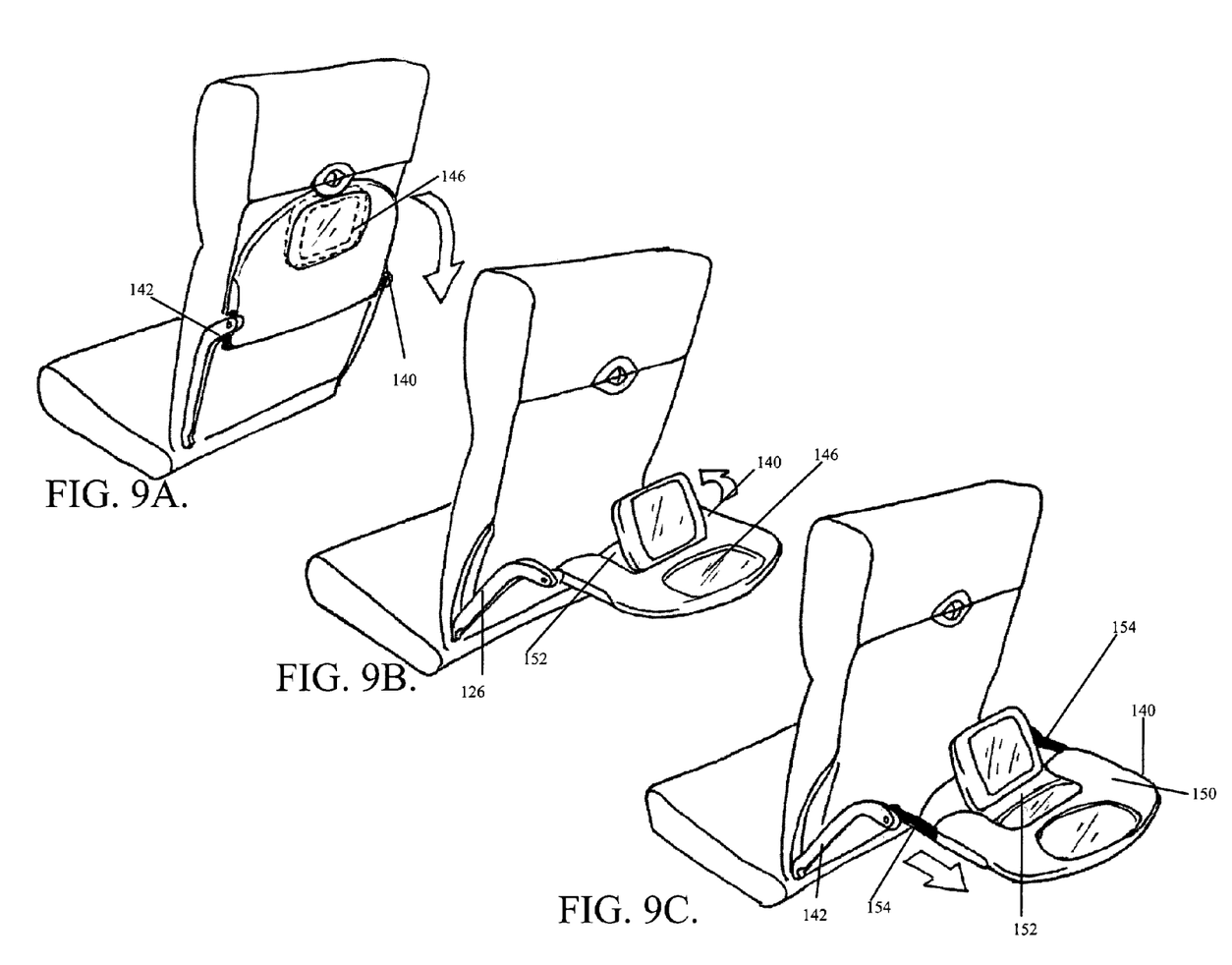

FIGS. 9A-C illustrates an alternate embodiment of the present invention. As shown in FIG. 9A, a tray table 140 includes a viewing window 146. The tray table 140, like conventional tray tables, is rotatably attached to tray table arms 142 that are rotatably attached to an approximate rotation point of the seat back. As show in FIGS. 9B and 9C, the tray table 140 includes a movable portion 150 and a stationary portion 152. A display 148 is rotatably attached to a stationary portion 152. When the tray table 140 is positioned in the up and locked position as shown in FIG. 9A, the display 148 rotates relative to the stationary portion 152 to a position that allows a viewer to see the display 148 through the window 146. As shown in FIG. 9C, the slidable portion 150 is slidably attached to support arms 154 that are rotatably attached to the tray table arms 142. In an alternate embodiment, the window 146 is a magnifying window for enlarging any images displayed on the display 146.

Figures 10A, 10B:
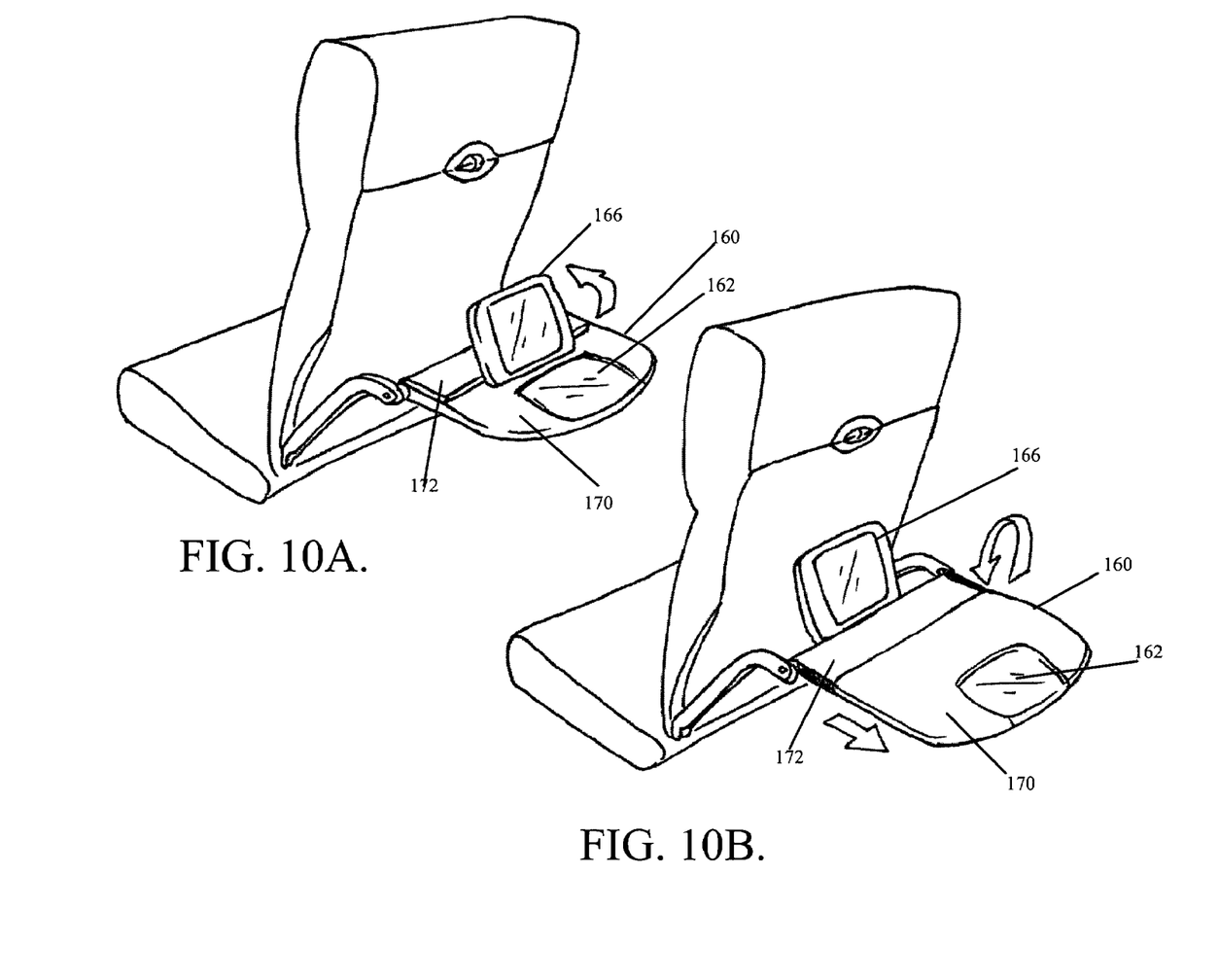

FIGS. 10A-B illustrate an embodiment similar to that shown in FIGS. 9A-C. As shown in FIG. 10A, a tray table 160 includes a window 162 that, like FIG. 9A, allows a user to view a display 166 through the window 162 when in the up and locked position. As shown in FIG. 10B, the tray table 160 includes a slidable portion 170 that extends towards the passenger similar to that shown FIG. 9C. The tray table 160 also includes a rotatable portion 172. The display 166 is rotatably attached to the rotatable portion 172. The display 166 is rotatably attached to one edge of the rotatable portion 172. An edge opposite of the edge that receives the display 166 is rotatably attached to either support arms for the tray table or some other portion stationary relative to the support arms. In order to create greater work space, the rotatable portion 172 is rotated forward or away from the passenger to a position where it is locked at an approximate parallel position to the slidable portion 170. The display 166 is then rotated about the edge which it is connected to in order to provide viewability by the passenger.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus comprising:
   a frame;
   a tray table having a first end mounted to the frame, the frame allowing the tray table to move between a stowed position and an extended position; and
   a communication and entertainment component including a display device and a user interface device, the display device hingedly mounted to the user interface device, the component mounted at the first end of the tray table, the table stowed by moving the first end upward to place the tray table in an upright position, wherein the component is also in an upright position, the table extended by moving a second end of the tray table outward into an extended position, wherein the display device is capable of being viewed both when the tray table is in the stowed position and when the tray table is in the extended position.

2. The apparatus of claim 1, wherein the tray table includes a mounting section having the first end attached to the frame, and a receiving section that is hinged to the mounting section.

3. The apparatus of claim 2, wherein the receiving section is lockable at a plurality of positions relative to the mounting section.

4. The apparatus of claim 2, further comprising a cursor control device, the cursor control device mounted into the mounting section and positioned adjacent to the user interface device.

5. The apparatus of claim 1, wherein the frame is designed to be attached to at least one of a bulkhead and a seatback.

6. The apparatus of claim 1, wherein the communication and entertainment component further comprises a processing device coupled to the display device.

7. The apparatus of claim 6, wherein the processing device is electrically coupled to at least one of an on-board entertainment system or telecommunications system.

8. The apparatus of claim 1, wherein the tray table includes a mounting section having the first end attached to the frame, and a receiving section that is slidably attached to the mounting section, the receiving section containing a cutout having a shape at least the size of the communication and entertainment component, the receiving section configured to slide along the mounting section such that the user interface is received into the cutout of the receiving section.

9. The apparatus of claim 1, wherein the tray table includes a mounting section having the first end attached to the frame, and a receiving section that is slidably attached to the mounting section, the receiving section having a clear section for viewing the display device when the tray table is in the stowed position.

10. The apparatus of claim 1, further comprising at least one of a head phone jack, a personal computer data, and power jacks.

11. Apparatus comprising:
a row seat for a vehicle;
a tray table including a mounting section having a first end and a receiving section having a second end;
a frame for mounting the mounting section of the tray table to a back of the seat; and
an entertainment component including a display device and a user interface mounted to the first end of the mounting section; the table stowed by moving the first end upward to move the tray table into an upright position, wherein the component is also in an upright position, the table extended by moving the second end away from the row seat to place the tray in an extended position, the display device capable of being viewed both when the tray table is in the stowed position and when the tray table is in the extended position.

12. The apparatus of claim 11, wherein the receiving section is hinged to the mounting section.

13. The apparatus of claim 11, wherein the receiving section is slidably attached to the mounting section, the receiving section containing a cutout having a shave at least the size of the component, the receiving section configured to slide along the mounting section such that the user interface is received into the cutout of the receiving section.

14. The apparatus of claim 12, wherein the receiving section is lockable at a plurality of positions relative to the mounting section.

15. The apparatus of claim 11, further comprising a cursor control device, the cursor control device positioned adjacent to the user interface device.

16. The apparatus of claim 11, wherein the receiving section contains a cutout having a shave at least the size of the component, and wherein the receiving section is configured to slide along the mounting section such that the user interface is received into the cutout of the receiving section.

17. The apparatus of claim 16, wherein the receiving section is slidably attached to the mounting section, and wherein the receiving section has a clear section for viewing the display device when the tray table is in the stowed position.

* * * * *

UNITED STATES PATENT AND TRADEMARK OFFICE
CERTIFICATE OF CORRECTION

PATENT NO. : 7,500,716 B2  Page 1 of 1
APPLICATION NO. : 10/172398
DATED : March 10, 2009
INVENTOR(S) : Jeanne Guerin It is certified that error appears in the above-identified patent and that said Letters Patent is hereby corrected as shown below:

Front page, item (75), change the last name of Second Inventor from "Cleflin" to --Claflin--

Signed and Sealed this

First Day of September, 2009

David J. Kappos
*Director of the United States Patent and Trademark Office*